Oct. 18, 1938.   P. C. McABEE   2,133,461
DRY ICE CONVERTER
Filed March 26, 1934   4 Sheets-Sheet 1
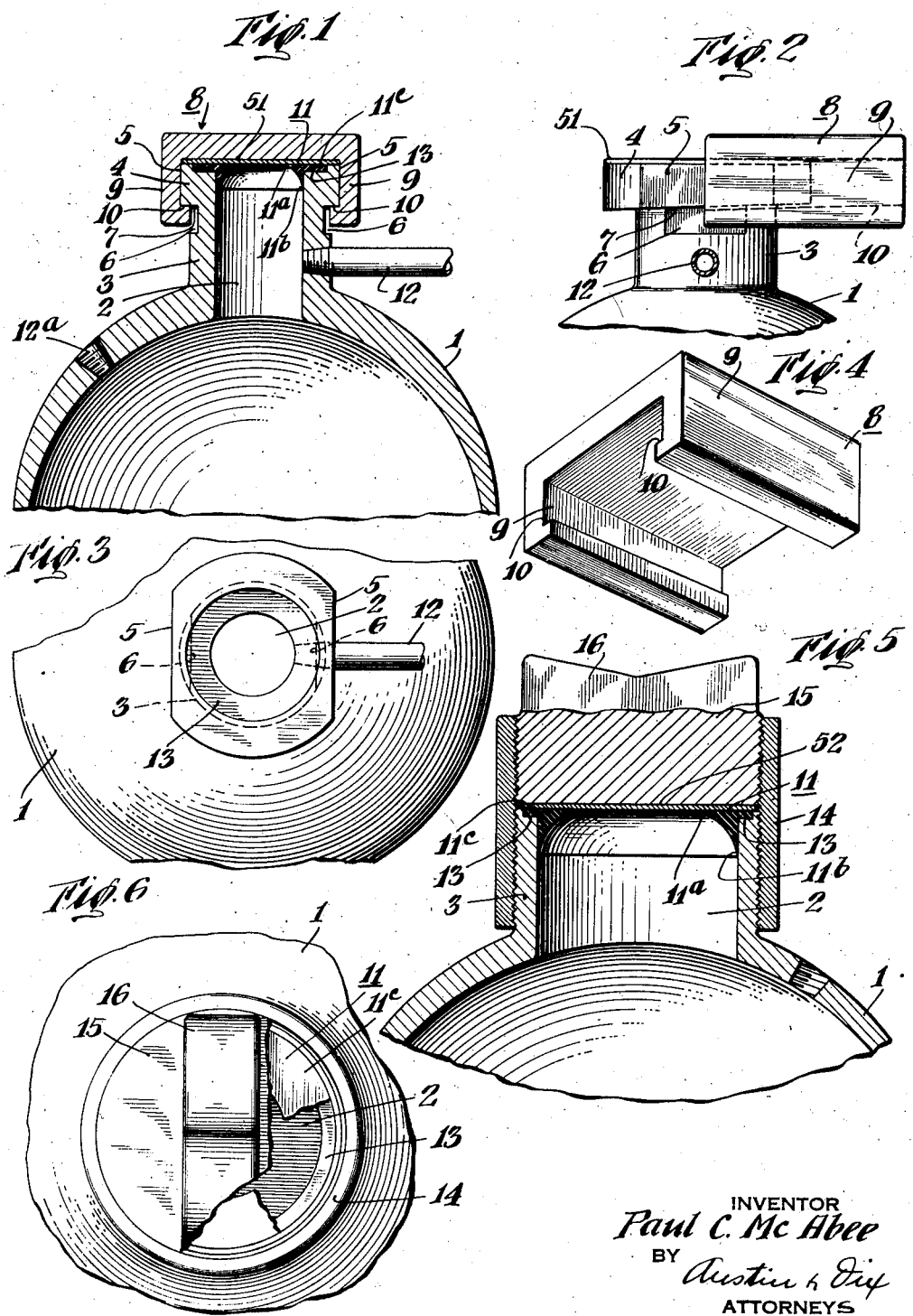
INVENTOR
Paul C. McAbee
BY
Austin & Dix
ATTORNEYS Oct. 18, 1938.  P. C. McABEE  2,133,461
DRY ICE CONVERTER
Filed March 26, 1934  4 Sheets-Sheet 2
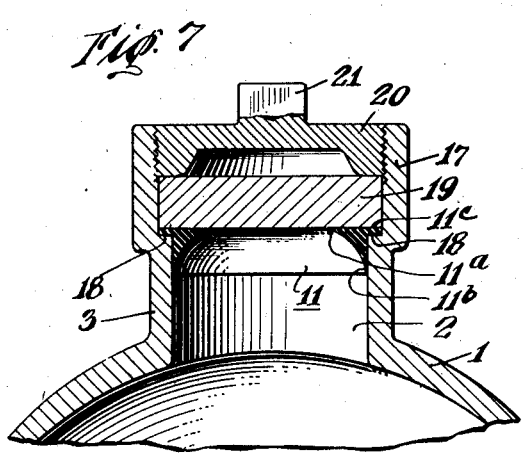
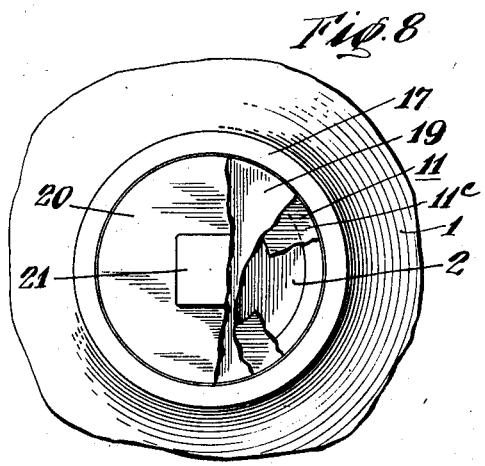
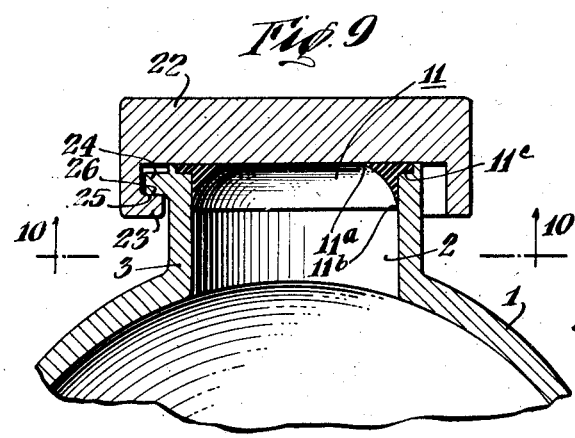
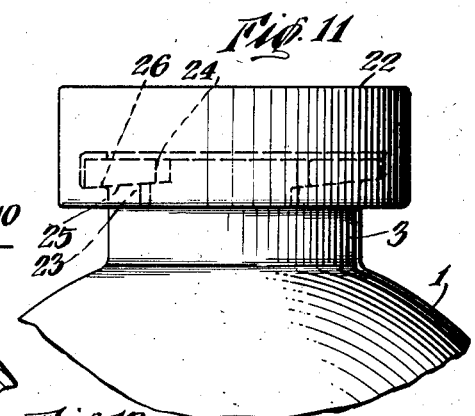
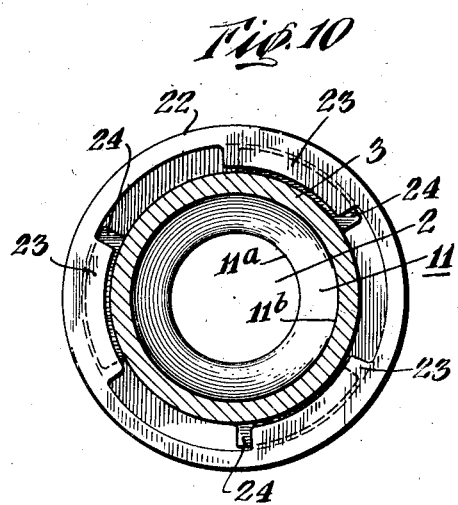
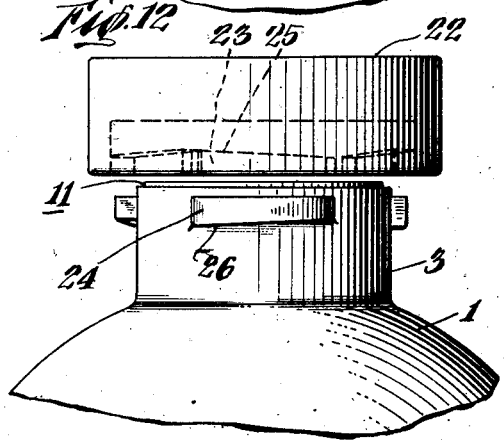
INVENTOR
Paul C. McAbee
BY
Austin & Dix
ATTORNEYS Oct. 18, 1938.   P. C. McABEE   2,133,461
DRY ICE CONVERTER
Filed March 26, 1934   4 Sheets-Sheet 3
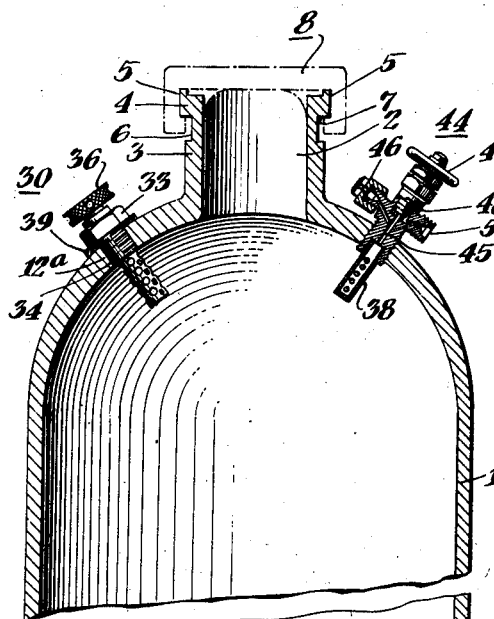
Fig. 13
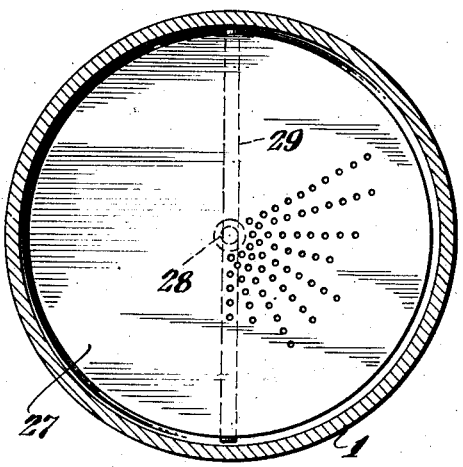
Fig. 15
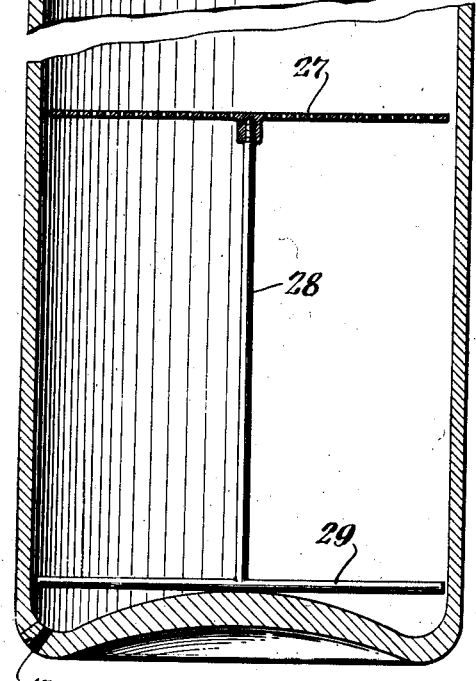
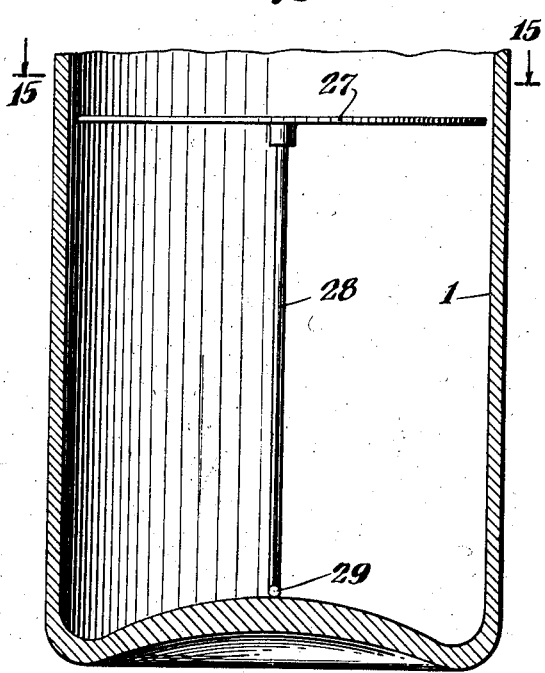
Fig. 14
INVENTOR
Paul C. McAbee
BY
Austin & Dix
ATTORNEYS Oct. 18, 1938.  P. C. McABEE  2,133,461
DRY ICE CONVERTER
Filed March 26, 1934  4 Sheets-Sheet 4

INVENTOR
Paul C. McAbee
BY
ATTORNEYS

Patented Oct. 18, 1938

2,133,461

UNITED STATES PATENT OFFICE 2,133,461

DRY ICE CONVERTER

Paul C. McAbee, New York, N. Y.

Application March 26, 1934, Serial No. 717,378

5 Claims. (Cl. 220—3)

This invention relates to containers for converting solids into liquids or gases, and more particularly to containers for converting solid carbon dioxide into liquid or gaseous form.

Such a container must provide an opening whereby it may be conveniently charged with the solid material. It must likewise have means for securely closing and sealing the opening to withstand the high pressures developed within the container. A container fulfilling the above requirements is disclosed in my copending application Serial No. 682,404, filed July 27, 1933.

According to one form of the present invention, a container or flask is provided having an improved closure which may be quickly and conveniently removed and replaced. The invention may further provide a novel sealing gasket for automatically sealing the closure in place when pressure is developed within the cylinder.

Means may likewise be provided to insure against excessive pressures within the container. This means may preferably comprise a device for preventing an overcharge of the solid material, such as solid carbon dioxide or dry ice, being placed in the container. The danger of excessive pressures may be further prevented by the use of an improved safety valve device.

The present invention likewise contemplates various modifications of the above forms, such as those hereinafter shown and described.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a sectional elevation of the upper end of the container having one form of improved closure means;

Fig. 2 is a side elevation taken at right angles to Fig. 1 and showing the cover partly removed;

Fig. 3 is a top view of the container with the cover removed;

Fig. 4 is a perspective view of the cover;

Fig. 5 is a sectional elevation of the upper end of the container with a modified form of closure for the charging opening;

Fig. 6 is a top view, partly in section, of the form shown in Fig. 5;

Fig. 7 is a sectional elevation of the upper end of the container with a further modified form of closure for the charging opening;

Fig. 8 is a top view, partly in section, of the form shown in Fig. 7;

Fig. 9 is a sectional elevation of the upper end of the container with another modified form of closure for the charging opening;

Fig. 10 is a horizontal section on the line 10—10 of Fig. 9;

Fig. 11 is a side elevation of the upper end of the container with the cover in place;

Fig. 12 is a side elevation of the upper end of the container and the cover with the cover removed;

Fig. 13 is a sectional elevation of the container having a partition dividing the upper and lower parts of the chamber;

Fig. 14 is a sectional elevation of the lower part of the container taken at right angles to Fig. 13;

Fig. 15 is a horizontal section on the line 15—15 of Fig. 14;

Figure 16:
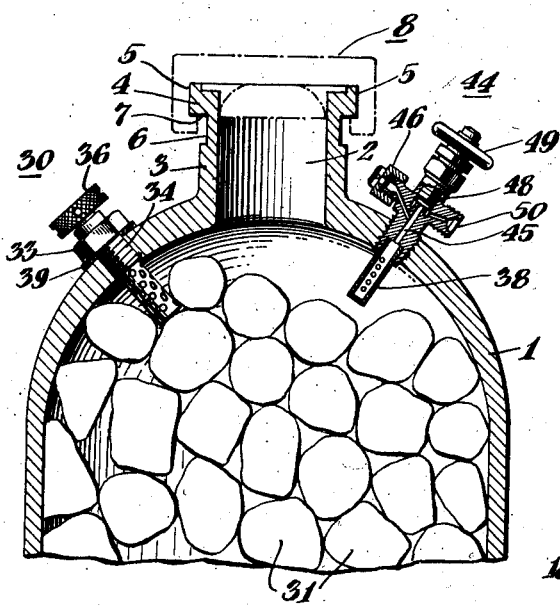
Fig. 16 is a sectional elevation of the upper part of the container having an improved fixture and safety valve device.
Figure 18:
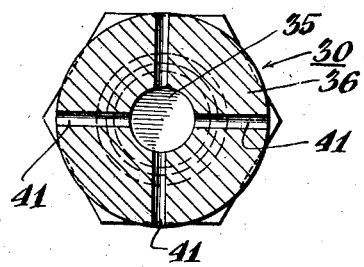
Fig. 18 is a section on the line 18—18 of Fig. 17.

In the following description and in the claims, various details will be identified by specific names for convenience but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 to 4, container or cylinder 1 is similar, in general, to the usual liquid carbon dioxide cylinders or flasks used for shipping liquid carbon dioxide and may be made by the same or similar operations and with the same or similar equipment as ordinarily used for making such cylinders. It is provided with a charging opening 2 which is preferably larger than the usual valve openings provided in the ordinary liquid carbon dioxide cylinders. Charging opening 2 may, for example, be two inches in diameter or greater, as is brought out in my above mentioned copending application. The side walls of the cylinder are formed at the upper end into a neck 3 surrounding opening 2. In the form shown in the figures, the neck is of considerably smaller diameter than the body of the container. In some instances, however, the upper shoulder may be eliminated in which instance neck 3 will be of the same diameter as the body of the cylinder or container.

A flange or rim 4 is formed at the upper end of the neck 3. The flange is flattened on two opposite sides to form parallel guideways 5. In addition, parallel grooves 6 are cut in the opposite sides of the neck 3 parallel to guideways 5. The upper edges 7 of both grooves 6 are cut to form inclined surfaces in the same plane.

Sliding cap or cover 8 may be rectangular in plan, as shown in Fig. 4. It is provided with recessed guides 9 arranged to cooperate with the guideways on the neck and thereby form a means for attaching the cover. The lower surfaces 10 of guides 9 on the cover are inclined and cooperate with the inclined surfaces 7 on the neck to form a wedging means for tightening the cover against the end of the neck 3. The body of the cover 8 presents a flat surface which covers the opening of the neck when the cover is in place. In order to overcome friction between cover 8 and gasket 11 and to prevent sticking, a thin rectangular metal plate 51 may be inserted under the cover.

A small annular recess or seat 13 is formed around the inside of the top of the neck to receive a self-sealing, soft rubber gasket 11. This gasket has an annular flange 11c seating in seat 13. Flange 11c may be of the same thickness or slightly greater than the depth of the seat 13. The inner edges of gasket 11 are tapered to relatively sharp annular flanges or lips 11a and 11b. Lip 11a extends inwardly and fits closely against the underside of plate 51 when the same is in place. Lip 11b extends downwardly and axially of the gasket in order to fit closely against the inner wall of neck 3.

The cylinder may be provided with the usual outlet pipe 12 in the side of the neck, whereby the compressed gas may be withdrawn or a pressure gauge may be attached. The cylinder wall may likewise be tapped at 12a to provide for attaching a safety valve device or for further withdrawing gas or liquid from the cylinder.

In order to charge the cylinder with solid, the cap 8 is withdrawn by hand by merely sliding it off laterally, as indicated in Fig. 2. When there is no gas pressure in the cylinder, this may be readily done by hand with little or no effort. Attaching and removing the cover may be facilitated, if desired, by placing a small quantity of lubricant between the underside of cover 8 and the top of plate 51. After the cover has been removed, the plate 51 is lifted off. The cylinder is then charged with the solid, such as carbon dioxide, by breaking the material up into sufficiently small pieces to pass through the opening 2 in the neck and feeding the material through the opening. If necessary, a funnel may be used to facilitate charging. When a sufficient quantity of the solid has been placed in the cylinder to produce the desired gas or liquid charge, the gasket 11 and plate 51 are placed in position on the top of the neck and the cover is slid into place on the top of the neck by hand. A tight fit is unnecessary. It is sufficient to slide the cover by hand completely over the opening until the inclined surfaces 7 and 10 snugly engage. The gasket flange 11c may or may not be initially compressed by the wedging action of the cover, but it will generally be found preferable to have the under surface of plate 51 engage or almost engage the wall of the seat 13.

As soon as some of the solid has changed into gaseous form due to the heat received from the surroundings, a gas pressure begins to build up in the container. This pressure will immediately compress the gasket, pressing the lips 11a and 11b against the underside of the plate and the inner wall of the neck 3, respectively, and causing the gasket material to distort and flow and tightly seal the joint between the flask and the plate. The flange 11c assists in the sealing operation and is also of use to prevent the gasket from dropping into the container when it is initially placed in position. The pressure may then build up to a value which will depend on the quantity of solid charge placed in the cylinder and the temperature of the room. In the case of carbon dioxide, after the pressure has reached a certain value (corresponding to the triple point on pressure-temperature diagrams), liquid carbon dioxide will begin to collect in the bottom of the cylinder and the carbon dioxide will eventually be entirely converted into liquid and gaseous form. The gas may then be withdrawn through pipe 12 and utilized in any manner desired.

Due to the pressure of the plate against the cover 8, it will be impossible to remove the cover as long as there is pressure in the container. Furthermore, it is impossible for pressure to build up with the cover on improperly. Thus perfect safety is insured in the use of the container and accidents due to the sudden release of the pressure are effectively prevented.

In the modified form of closure shown in Figs. 5 and 6, neck 3 is of uniform thickness substantially throughout its length and is threaded on the outside to receive an annular sleeve 14 which is threaded to screw onto the neck. Gasket 11 rests in the annular recess or seat 13a on the top of the neck 3, as shown. A thin circular metal disc 52 rests on top of gasket 11 and performs a similar function to plate 51 in Fig. 1. A screw cap or cover 15 having a wing handle 16 is adapted to screw into the upper end of sleeve 14. Disc 52 may be inserted and cap 15 may be screwed down against the top of the disc by hand after the charging operation. The cylinder will be effectively sealed by self-sealing gasket 11 as soon as pressure develops.

While the handle 16 may be grasped either by hand or by a small wrench, it will ordinarily be sufficient to screw it down by hand without further clamping. With the improved form of gasket which I have developed it is not necessary to tighten the cover greatly since the sealing occurs automatically regardless of the tightness of the joint.

In the further modified form of closure shown in Figs. 7 and 8, the neck 3 is extended into an integral upper neck 17 of somewhat larger diameter than neck 3. A shoulder 18 is thus formed half way down the inside of the neck to receive gasket 11. The inside of enlarged neck 17 is threaded for approximately half its length.

For sealing the container, a pressure plate 19 in the form of a thick metal disc is inserted in the enlarged neck and rests on the upper surface of gasket 11. A screw cap or cover 20, which may be of hollow construction, as shown, is then screwed into the neck 17 against the pressure plate 19. A square lug 21 is provided on the top of cap 20 to receive a small wrench. It is obvious, however, that a wing handle, such as shown in Figs. 5 and 6, may be used with equal facility. The hollow construction of the cover, whereby an annular flange is formed at its outer edge, facilitates the attaching and removing of the cover. It also provides a lighter cover which is handled more easily.

In the modified form of closure shown in Figs. 9, 10, 11 and 12, cover 22 is adapted to be secured to neck 3 by a bayonet slot arrangement. In this arrangement a plurality of lugs 23 are provided on the cap to cooperate with a corresponding plurality of lugs 24 on the neck. Lugs 23 on the cap are provided with sloping surfaces 25 which cooperate with sloping surfaces 26 on the neck lugs to form a tightening means for the cover. In this arrangement a circular sealing disc, similar to disc 52 in Fig. 5, but preferably of the same diameter as flange 11c and seating within the recessed seat, may be used, if necessary, or the cover may rest directly against the gasket, as illustrated.

In closing the cylinder, cover 22 is placed on the top of neck 3 in such a position that lugs 23 on the cover fit between lugs 24 on the neck (see Fig. 12). The cap is then rotated in a clockwise direction until the inclined surfaces 25 and 26 meet and pull the cap snugly down against gasket 11 resting in a seat on the top of the neck. (See Figs. 10 and 11.) In the form illustrated in the figures, three lugs are provided on the cover and neck, respectively, and in this instance the cap would be turned approximately 60° after being placed on the neck of the cylinder.

In Figs. 13, 14 and 15, a horizontal foraminous partition 27 is shown dividing the inside of cylindrical container 1 into upper and lower sections or chambers. Partition 27 is supported by a standard 28 resting on the bottom of cylinder 1. A cross bar 29 extending across the bottom of the cylinder serves to position and support the standard. The partition and supports may suitably be placed in the partly formed container before the shoulder and neck have been formed thereon.

Partition 27 serves to prevent an excessive charge of the solid material being placed in the cylinder, whereby pressures might be developed which exceed the rated strength of the cylinder. The partition may be approximately one-third of the distance up from the bottom of the cylinder. Its exact position may be predetermined from a consideration of the size of upper chamber just sufficient to accommodate the proper charge of solid. Legal requirements for carbon dioxide provide that no more than a certain specified weight may be charged into a given commercial cylinder. Without partition 27, there is great danger that an inexperienced or careless person may place an excessive and dangerous quantity of the solid material in the cylinder.

With my arrangement, using partition 27, the solid material may fill only into the upper part of the cylinder thereby eliminating danger of overcharging. As the material is changed from the solid into liquid or gaseous form, it will readily pass through the holes in partition 27 and the pressure will be uniformly distributed throughout the cylinder. The liquid may be withdrawn through opening 43 in the bottom of the container by suitable conduits and the gas may be withdrawn through gas valve fixture 44 in a well known manner.

In Figs. 16, 17, 18 and 19, improved forms of safety valve and of gas valve fixture are illustrated. In Fig. 16 safety valve device 30 is shown attached to the side wall of cylinder 1, here illustrated as being filled with the dry ice 31 which may rest on a false bottom, such as 27 in Fig. 13.

Safety device 30 is tightly screwed into the side of the cylinder and the joint is sealed by means of an annular gasket 39. Safety valve 30 follows, in general, the form of the usual safety devices used for such purposes and comprises a hollow shank portion 32 having an enlarged part 33 adapted to receive a wrench and a threaded part 34 adapted to screw into the wall of the cylinder. A small fracturable disc 35, which may be made of copper or other soft metal, rests on the outer end of shank 32 covering the bore 42 therein and a knurled screw cap 36 is screwed tightly down over the disc. Knurled cap 36 is provided with openings or passageways 41 through which the gas may escape in case disc 35 is fractured by excessive pressure.

Gas valve fixture 44 is likewise tightly screwed into the cylinder wall. It is similar in construction to the standard gas valve used with compressed gas containers. It comprises a body portion having inlet passages 45 leading from the inside of the container to an auxiliary safety valve 46 and a gas outlet valve 48 manually operated by a handle or knob 49 to control the flow of gas to outlet passage 50.

According to my invention, means are provided on the safety device and on the gas valve fixture for preventing foreign material from entering the gas passageways 42 and 45, respectively. In the ordinary form of liquid carbon dioxide cylinders, in which liquid carbon dioxide is shipped from the manufacturer, there may be less danger of foreign material getting into the inside of the cylinder and clogging the valve. With a carbon dioxide converter, however, foreign matter is more likely to get into the cylinder and render the safety device inoperative. Pieces of paper, for example, may occasionally be mixed in with the dry ice when it is charged into the cylinder. Metal scale, too, may sometimes be found in the cylinder.

Figure 17:
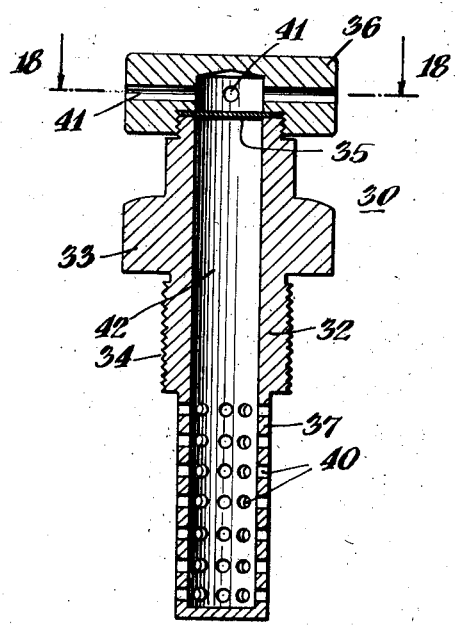
Fig. 17 is an enlarged section of the safety valve device.
Figure 19:
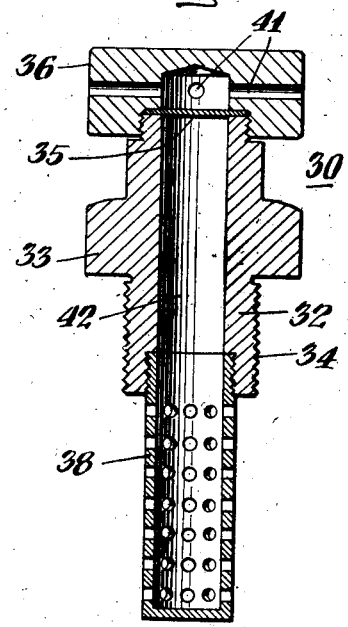
Fig. 19 is a section of a modified form of the safety valve device.

In order to effectively keep the passages 42 and 45 clear at all times, I have provided foraminous thimbles covering the inner ends of these passages. These thimbles may be integral with the body portions of the fixtures, as shown in Fig. 17, where thimble 37 is shown integral with shank 32. If desired, however, they may be threaded into the body portions, as shown at 38 in Fig. 19. With the latter construction, it is possible to modify the present standard safety valves or valve fixtures to accommodate the thimbles by tapping threads in the entrances to the gas passages and screwing the thimbles into them.

It will be understood that the combined area of the holes 40 in the thimbles or screens is equal to or preferably greater than the cross sectional area of the gas passage of the safety valve or fixture.

The thimbles here disclosed are especially convenient since they permit the valves to be removed and replaced entirely from the outside of the cylinder. Other modified forms of screening devices may be used, however, such as a screen thimble or cap provided with an inside threaded rim which will screw onto external threads 34 from the inside of the cylinder. With either form of thimble or screen, the passages in the safety valves and gas valves are effectively kept clear of foreign solid matter.

While certain novel features of the invention have been disclosed and are pointed out in the annexed claims, it will be understood that various omissions, substitutions and changes may be made by those skilled in the art without departing from the spirit of the invention.

What is claimed is:

1. In a converter for dry ice or the like, a container having an opening and an annular seat, a closure for said opening, the wall of said closure being angularly related to the wall of said container, an annular gasket of soft giveable material seated in said seat and comprising an annular body having an annular, radial, inwardly projecting flange and an annular, axially projecting flange, said axial and inwardly projecting flanges having comparatively sharp free edges, said body bridging the joint between said closure and container walls, said annular, inwardly projecting flange being held against said closure wall and said axially projecting flange being held against said container wall by direct exposure to pressure generated within the container.

2. In a converter for dry ice or the like, a container having a cylindrical opening and an inwardly projecting seat intermediate the length of said opening, said opening being internally threaded above said seat and having a smooth cylindrical side wall below said seat, an annular gasket of soft, giveable material comprising an annular body having an annular, radial, outwardly projecting flange resting on said seat, said body having an annular, radial, inwardly projecting flange and an annular axially projecting flange, said axial and inwardly projecting flanges having comparatively sharp free edges, a threaded closure engaged in said threaded opening and having a flat, radial surface, said gasket body bridging the joint between said flat surface and said opening, said annular, inwardly projecting flange being held against said flat surface and said axially projecting flange being held against the smooth cylindrical side wall of said container by direct exposure to pressure generated within the container.

3. In a converter for dry ice or the like, a container having an opening with an annular seat, a closure for said opening, the wall of said closure being angularly related to the side wall of said container, an annular gasket of soft giveable material seated in said seat and comprising an annular body having an annular, radial, inwardly extending surface and an annular, axially extending surface, said body bridging the joint between said closure and container walls, said annular, inwardly extending surface being held against said closure wall and said axially extending surface being held against said container wall by direct exposure to pressure generated within the container.

4. In a converter for dry ice or the like, a container having a cylindrical opening and an inwardly projecting seat intermediate the length of said opening, said opening being internally threaded above said seat and having a smooth cylindrical side wall below said seat, an annular gasket of soft, giveable material comprising an annular body having an annular, radial, outwardly projecting flange resting on said seat, said body having an annular, radial, inwardly extending surface and an annular, axially extending surface, a threaded closure engaged in said threaded opening and having a flat, radial surface, said gasket body bridging the joint between said flat surface and said opening, said annular, inwardly extending surface being held against the flat surface of said closure and said axially extending surface being held against the smooth cylindrical side wall of said container by the direct exposure to pressure generated within the container.

5. In a dry ice converter or the like, a container having an opening with an annular, inwardly projecting shoulder forming a seat, said opening being internally threaded above said seat and having a smooth side wall below said seat, a threaded plug disposed in said threaded opening, a ring-like gasket having an annular main body portion provided with a peripheral lip resting on said seat, said body portion having two sides, one side of said body portion resting against the lower surface of said plug inwardly of said seat, the other side of said body portion resting against the inner wall of the container under said seat, said sides being held against their respective walls by direct exposure to pressure generated within the container.

PAUL C. McABEE.